3,170,787
PROCESS FOR THE PRODUCTION OF ALUMINUM
Ryoma Tanaka, Juntaro Yurimoto, and Hirosuke Ryu, Niihama-shi, Japan, assignors to Sumitomo Chemical Company, Ltd., Higashi-ku, Osaka, Japan
No Drawing. Filed Oct. 8, 1962, Ser. No. 229,165
Claims priority, application Japan, Oct. 10, 1961, 36/36,745
3 Claims. (Cl. 75—68)

The present invention relates to a process for the production of high purity aluminum, together with an olefin and hydrogen, by thermal decomposition or pyrolysis of an alkylaluminum compound and/or its complex compound under a condition where no aluminum carbide is produced.

K. Ziegler et al. have suggested a process for the production of aluminum by thermal decomposition or pyrolysis of alkylaluminum compounds (for example, Angew. Chem., vol. 67, No. 16, pp. 424–425 (1925); British Patent No. 788,619; Japanese Patent Publication No. SHO 32-2454). In this process, however, the actual production of aluminum is generally accompanied by the formation of a considerably large amount of aluminum carbide as a by-product.

It is natural that the formation of by-product, aluminum carbide, decreases the yield of aluminum to be produced by the thermal decomposition. Moreover, it is widely known in the manufacturing industries that the inclusion of a considerable amount of aluminum carbide in aluminum causes deleterious effects to the processability, corrosion resistance and other characteristics of the product aluminum. Therefore, a troublesome process for removal of said carbide is required to obtain a substantially pure aluminum.

The formation of such by-product as aluminum carbide can be controlled by such methods as the thermal decomposition of an alkylaluminum compound in a thermally stable solvent, or the thermal decomposition of a complex compound which is prepared by combining an alkylaluminum compound with an alkali compound, an ether, an amine and the like.

Now, the inventors have discovered that the amount of aluminum carbide as a by-product, is closely related to the decomposition rate of alkylaluminum compounds and/or their complex compounds which are decomposed according to the processes as mentioned above. Further, they have discovered that the same relation is also found when a single alkylaluminum compound is thermally decomposed. Thus, it has been found that the formation of aluminum carbide can significantly be suppressed and aluminum can be produced in substantially pure state, if the thermal decomposition of an alkylaluminum compound and/or its complex compound is carried out at an adequate decomposition rate.

It appears that the decomposition rate is kept constant for the unit quantity of the existing alkylaluminum compound when the thermal decomposition of an alkylaluminum compound is performed at a constant temperature in a flask according to the examples of the patent of K. Ziegler. Actually in such a process for the thermal decomposition, the amount of the liquid phase portion decreases as the reaction proceeds, therefore the isolated aluminum gradually adsorbs and includes the alkylaluminum compound which is not decomposed yet. Thus, it has been found that, if the decomposition temperature is only kept constant regardless of decrease of the amount of the liquid phase portion, the decomposition rate becomes substantially less for the unit quantity of the alkylaluminum compound and such a remarkable decrease in the decomposition rate unavoidably causes the formation of a large amount of by-product, aluminum carbide.

It has been found that the formation of aluminum carbide in the decomposition process as shown by K. Ziegler may be substantially prevented if the temperature of the reaction mass is gradually elevated as the liquid phase portion in the reaction mass decreases, so as to keep the decomposition rate at the same level as at the initial stage. In fact, it has been confirmed that such procedure significantly decreases the formation of aluminum carbide.

Accordingly, it is an object of the present invention to provide a process for the production of aluminum which contains substantially no aluminum carbide, by a simple control of the reaction condition. Other objects will be apparent from the following descriptions.

To accomplish these objects, the present invention provides a process for producing substantially pure aluminum by the thermal decomposition of an alkylaluminum compound having the general formula of

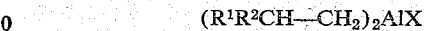

$(R^1R^2CH-CH_2)_2AlX$ where $R^1$ and $R^2$ are respectively selected from the group consisting of hydrogen atom and alkyl radicals and X is selected from the group consisting of the hydrogen atom and $R^1R^2CH-CH_2-$ radical, and/or a complex compound thereof, directly or in a solvent, at a decomposition rate which suppresses the formation of by-product, aluminum carbide.

Said alkylaluminum compounds available in the present invention are any of alkylaluminum compounds having the general formula of $(R^1R^2CH-CH_2)_2AlX$, where $R^1$ and $R^2$ are respectively selected from the group consisting of hydrogen atom and alkyl radicals and X is selected from the group consisting of hydrogen atom and $R^1R^2CH-CH_2-$ radical, such as triethylaluminum, diethyl aluminum hydride, triisobutylaluminum, diisobutylaluminum hydride and the like. Naturally, the mixture of two or more said compounds are also suitable. Furthermore, suitable complex compounds of these alkylaluminum compounds are prepared by combining an alkylaluminum compound with a complex-forming compound, for example, alkali metal compound such as ethylsodium, sodium fluoride, sodium hydride, potassium fluoride, lithium hydride and the like, an ether such as diethyl ether, di-n-propyl ether, di-n-butyl ether, diisobutyl ether, diisoamyl ether, isopropyl-n-butyl ether, dioctyl ether, diphenyl ether, anisole, benzyl ethyl ether, tetrahydrofuran, dioxane and the like, an amine such as triethylamine, diethyl isopropylamine, triisopropylamine, tri-n-propylamine, tri-n-butylamine, N,N-dimethylaniline, piperidine and the like, or a quaternary ammonium salt such as tetraethylammonium iodide, tetra-n-propylammonium chloride, n-butyltrimethylammonium bromide and the like. Naturally, a mixture of two or more such complex compounds, and a mixture of said complex compound with an alkylaluminum compound, are both suitable. Alkylaluminum compounds and/or their complex compounds can be decomposed by direct heating, or can be thermally decomposed in such solvents as petroleum, paraffin, alkylbenzene, alkylnaphthalene, diphenyl and the like. Such alkylaluminum compounds and/or complex compounds are heated directly or in the solvent up to a temperature at which said compounds are decomposed and aluminum can be isolated. Said temperature varies somewhat depending upon the kind of alkylaluminum compounds or their complex compounds, the presence or absence of solvent and the kind of solvent. Generally, the decomposition reaction begins above 180° C., but it is actually desirable that the reaction temperature is kept in a range from 200° to 300° C. However, if a proper decomposition rate is not selected even in said temperature range, the formation of by-product, aluminum carbide, can not be suppressed and substantially pure aluminum can not be obtained. Said proper decomposition rate varies somewhat depending upon the kinds of alkylaluminum compounds or those complex compounds, and the presence or the absence of solvent and kinds of a solvent. When the complex compounds of alkylaluminum compounds are directly decomposed or when alkylaluminum compounds and/or their complex compounds are decomposed in a solvent, aluminum carbide included in the isolated aluminum is less than 1% at maximum, and usually less than 0.1%, at the decomposition rate of more than 0.5% (in mol) per minute for alkyaluminum compound existing in the heating zone, and, at the decomposition rate of more than 3% (in mol) per minute, aluminum carbide included in the isolated aluminum is markedly decreased, so substantially pure aluminum can be obtained. That is, in cases where a complex compound of alkylaluminum compounds are directly decomposed or an alkylaluminum compound and/or its complex compound is decomposed in the solvent, Table 1 indicates the aluminum carbide content in the isolated aluminum which is respectively prepared at the decomposition rates of 0.1%, 0.5% and 3% (in mol) per minute for the alkylaluminum compound existing in the heating zone.

TABLE 1

| Decomposition rate, percent (in mol)/min. | Aluminum carbide content (percent) |
| --- | --- |
| 0.1 | 1–5 |
| 0.5 | 0.01–1 |
| 3 | 0.001–0.01 |

In the case where a single alkylaluminum compound is decomposed by heat, generally, the formation of by-product, aluminum carbide, apparently tends to increase as compared with the thermal decomposition of the same alkylaluminum compound in a solvent or the application of its complex compound as a raw material. Therefore, in order to suppress the formation of by-product, aluminum carbide, to the same degree as in the decomposition in a solvent or the decomposition of the complex compound, the direct decomposition of alkylaluminum compound should be carried out at a higher decomposition rate.

Very small amounts of metal impurities such as Fe, Si and the like, are contained in such aluminum as obtained by the thermal decomposition of alkyaluminum compounds, so less than 1% of aluminum carbide content as indicated in the above table, assures a quality of more than 99% pure aluminum, which is actually available from the industrial point of view.

Continuous and batch processes are suitable as the process for performing the present invention, but the continuous process is especially preferable. For the performance of this process, alkylaluminum compounds or their complex compounds are heated in a reaction vessel and the temperature is adjusted to obtain the proper decomposition rate, according to the volume of generated gas during the decomposition. It is sufficient to continuously feed the equivalent amount of alkylaluminum compound with relation to the consumption. Thus, the proper decomposition rate of the alkylaluminum compound existing in the heating zone can be continuously maintained by feeding an equivalent amount of the fresh alkylaluminum compound as it consumed. In this process, aluminum is continuously obtained, so it should be taken out from the heating zone continuously or intermittently by a proper method. Moreover, this continuous process is similarly suitable in the presence of a solvent. To supplement the alkylaluminum compound, it may be fed directly into the heating zone or, after taking the reaction liquid out of the heating zone, it may be mixed with the liquid and the mixture may be fed into the heating zone, again.

For the decomposition a single alkylaluminum compound in a batch process, the amount of the liquid phase portion decreases as the reaction proceeds, so, it is necessary to gradually raise the temperature so that the decomposition rate will not be lowered for the unit quantity of the alkylaluminum existing in the heating zone. Generally, it is necessary in the performance of the present invention process to adjust the decomposition rate properly according to the kind of alkylaluminum compounds or their complex compounds, the presence or the absence of solvent and the kind of solvent.

*Example 1*

The space portion of a four-necked flask equipped with a thermometer, a dropping funnel, a stirrer and a gas outlet tube connected with a gas storage tank was substituted with nitrogen atmosphere, and, then, 198 g. (1 mol) of triisobutylaluminum were respectively charged in the flask and the dropping funnel. The flask was gradually heated at the bottom by means of a flask heater and the temperature was adjusted to generate the decomposition gas at the rate of 0.13 mol per minute (which, in this case, corresponds to about 3% (in mol) per minute of the triisobutylaluminum charged in the flask). Then, according to the amount of said generation, an amount of triisobutylaluminum equivalent to that of the consumption was fed by means of the dropping funnel. The dropping was completed after about 35 minutes and, immediately, heating was stopped.

The yields of aluminum and decomposition gas were respectively 26.5 g. and 101 liters (at 0° C. and 1 atm.).

The aluminum carbide content in the isolated aluminum was 0.02% in weight in the analytical result.

In a similar apparatus, applying the same amount of said material, the decomposition gas was controlled to generate at the rate of 0.0045 mol per minute (which, in this case, corresponds to about 0.1% (in mol) per minute of the triisobutylaluminum charged in the flask). Feeding an amount of triisobutylaluminum equivalent to that of the consumption, the dropping was completed after about 16 hours and 40 minutes. The aluminum carbide content in the isolated aluminum was 2.5% in weight.

*Example 2*

After the space portion of the four-necked flask was substituted with nitrogen atmosphere in a similar apparatus as used in Example 1, 114 g. (one mol) of triethylaluminum were respectively charged into the flask and the dropping funnel. The flask was gradually heated at the bottom by means of a flask heater and the temperature was adjusted to generate the decomposition gas at the rate of 0.13 mol per minute. Then, according to the amount of said generation, an amount of triethylaluminum equivalent to that of the consumption was fed by means of the dropping funnel. The dropping was completed after about 35 minutes and, immediately, heating was stopped. The yields of aluminum and decomposition gas were respectively 26.7 g. and 105 liters (at 0° C. and 1 atm.).

The aluminum carbide content in the isolated aluminum was 0.5% in weight in the analytical result.

In a similar apparatus, applying the same amount of said material, the decomposition gas was controlled to generate at the rate of 0.0045 mol per minute. Feeding an amount of triethylaluminum equivalent to that of the consumption, the dropping was completed after about 16 hours and 40 minutes. The aluminum carbide content in the isolated aluminum was 17% in weight.

*Example 3*

After the space portion of the four-necked flask was substituted with nitrogen atmosphere in a similar apparatus as used in Example 1, 65 g. (0.5 mol) of diisobutyl ether and 99 g. (0.5 mol) of triisobutylaluminum were fed and mixed to form a complex compound in the flask, and 99 g. (0.5 mol) of triisobutylaluminum were charged into the dropping funnel.

The flask was gradually heated at the bottom by means of a flask heater and the temperature was adjusted to generate the decomposition gas at the rate of 0.065 mol per minute. Then, according to the amount of said generation, an amount of triisobutylaluminum equivalent to that of the consumption was fed by means of the dropping funnel. The dropping was completed after about 35 minutes and, immediately, heating was stopped. The yield of aluminum and decomposition gas were respectively 13.2 g. and 52 liters (at 0° C. and 1 atm.).

The aluminum carbide content in the isolated aluminum was less than 0.001% in weight in the analytical result.

In a similar apparatus, applying respectively the same amounts of said materials, the decomposition gas was controlled to generate at the rate of 0.0023 mol per minute. Feeding an amount of triisobutylaluminum equivalent to that of the consumption, the dropping was completed after about 16 hours and 30 minutes. The aluminum carbide content in the isolated aluminum was 1.0% in weight.

What we claim is:
1. A process for the production of aluminum, which comprises heating at least one alkylaluminum compound having the general formula of $(R^1R^2CH-CH_2)_2AlX$, wherein $R^1$ and $R^2$ are each selected from the group consisting of hydrogen atom and alkyl radicals and X is selected from the group consisting of hydrogen atom and $R^1R^2CH-CH_2-$ radicals at a temperature between 200° C. and 300° C., while in the form of a liquid in a heating zone, to thermally decompose the said alkylaluminum compound to give aluminum, hydrogen and olefin, while keeping the decomposition rate of the said alkylalumium compound at a rate of more than 3% in mole per minute based upon the total number of moles of the said alkylaluminum compound present in the said heating zone, by measuring the volume of the generated gas during the decomposition reaction.

2. The process of claim 1, wherein said alkylaluminum compound is in a liquid solvent for the said compound.

3. The process of claim 1, wherein the process proceeds continuously and an amount of the said alkylaluminum compound is continuously supplied to said heating zone, equivalent to that which is consumed by the said thermal decomposition.

References Cited by the Examiner
UNITED STATES PATENTS 2,843,474  7/58  Ziegler et al. _____ 75—68
2,867,546  1/59  MacNevin.

BENJAMIN HENKIN, *Primary Examiner.*

DAVID L. RECK, *Examiner.*